United States Patent [19]

Lush et al.

[11] Patent Number: 5,479,881
[45] Date of Patent: Jan. 2, 1996

[54] SEMI-RIGID WILD GAME FEEDER APPARATUS

[76] Inventors: Twila Lush, 410 E. Main, Bloomfield, Nebr. 68718; Mark Chohon, H.C. 65, Box 46, O'Niell, Nebr. 68263

[21] Appl. No.: 312,828

[22] Filed: Sep. 27, 1994

[51] Int. Cl.⁶ ................................................. A01K 39/00
[52] U.S. Cl. ........................................................... 119/57.8
[58] Field of Search .................... 119/18, 51.3, 52.2, 119/57.8

[56] References Cited

U.S. PATENT DOCUMENTS

| | | | |
|---|---|---|---|
| D. 195,628 | 7/1963 | Andreae | D31/2 |
| 3,179,244 | 4/1965 | Kuhn | 119/52.2 |
| 3,441,002 | 4/1969 | Lawalin et al. | 119/52.2 |
| 3,568,641 | 3/1971 | Kilham | 119/51 |
| 3,945,344 | 3/1976 | Melrath | 119/57.8 |
| 4,026,244 | 5/1977 | Salick | 119/57.8 |
| 4,104,987 | 8/1978 | Winston | 119/57.8 |
| 4,215,652 | 8/1980 | Kerscher | 119/51 R |
| 4,233,941 | 11/1980 | Webster | 119/52.2 |
| 4,607,597 | 8/1986 | Sevigny | 119/51 R |
| 4,706,851 | 11/1987 | Hegedus et al. | 119/52.2 |
| 4,958,595 | 9/1990 | Richman | 119/57.8 X |
| 5,025,753 | 6/1991 | Schneider | 119/57.8 X |

FOREIGN PATENT DOCUMENTS

| | | | |
|---|---|---|---|
| 3149939 | 6/1983 | Germany | 119/52.2 |
| 2222928 | 3/1990 | United Kingdom | A01K 39/01 |

*Primary Examiner*—Gene Mancene
*Assistant Examiner*—Thomas Price
*Attorney, Agent, or Firm*—John A. Beehner

[57] ABSTRACT

A disposable wild game feeder for containing and making available feed for the feeding of wild game including birds, squirrels or the like. The feeder has a generally cylindrical, semi-rigid bag having top and bottom ends. The bag is self-standing when placed on the bottom end. It has a device for dispensing feed from the bag and a device for releasably closing the dispensing device so as to retain the feed in the bag during storage. It also has removable device on the bag for supporting wild game adjacent the feeder during feeding therefrom.

7 Claims, 4 Drawing Sheets

SEMI-RIGID WILD GAME FEEDER APPARATUS

BACKGROUND OF THE INVENTION

1. Technical Field

The apparatus of the present invention relates generally to a wild game feeder, more specifically, it relates to a semi-rigid bag wild game feeder which is adapted to be self-supporting and which has a plurality of removable, supporting dowels projecting therefrom. A main feature of the present invention is the semi-rigidity of the bag containing the feed and a generally horizontal flat bottomed surface which allows the bag to be placed on a horizontal surface and to be self-standing. This self-standing feature has two important benefits. First, in conjunction with the removability of the support dowels, it allows the bag to be more easily stored and displayed on store shelves while awaiting sale. Secondly, it allows the wild game feeder to be used in environments where no supporting projection from which the bag could be hung exists. Therefore, the utility of the feeder is greatly enhanced by its lack of a need for a hanging support member.

Feeding of wild games such as birds and squirrels is done basically for two reasons. First it is aesthetically pleasing to have different species of wild game within sight of the house. It is entertaining for both adults and children alike to observe different wild game species which are not always commonly seen in the wild without the enticement of a wild game feeder. A second reason for attracting wild games into one's yard is the ecological enhancement provided by the presence of the wild game. For example, birds consume a wide variety of bugs and flying insects as food. Therefore, the presence of birds is likely to reduce the insect population. Therefore, on several different levels, it is desirable to attract wild game into one's yard.

The most efficient way of accomplishing this, of course, is use of a wild game feeder. Not only does it give the game added reason to enter the yard, but it gives one a specific point on which to focus one's attention to observe such wild game.

Currently, there are an extremely large number of feeder apparatus on the market. However, nearly all of these apparatus require the existence of some horizontal projecting member such as a tree branch, nail, or the like from which the bag would be hung. This somewhat reduces the utility of the feeder apparatus since such a horizontal projecting member is not always available. Consequently, it is highly desirable to provide a feeder apparatus which, while adapted to utilize such a tree branch or the like for support, does not require it.

2. Description of the Prior Art

Prior art feeder devices are quite numerous. However, the vast majority of these devices require a tree branch or the like for support.

Several examples of prior art bird feeder devices are Hegedus, et al., U.S. Pat. No. 4,706,871, Burns, U.K. Patent No. 2,222,928, Salick, U.S. Pat. No. 4,026,024. Hegedus, Burns and Salick all have a bag or sock which is adapted to receive and store the bird feed. However, as is common with the prior art feeders, the bags are not self-supporting and must be hung from a tree branch or the like.

Consequently, it is a primary objective of the present invention to provide a feeder apparatus which is constructed of a semi-rigid bag having a generally flat bottom and such that the bag is adapted to be self-supporting.

It is a further objective of the present invention to provide a feeder apparatus which is adapted to receive at least one projecting member therethrough so as to provide a means for feeding birds or the like, to perch thereon.

It is a further objective of the present invention to provide a means for releasably sealing the bag to prevent spillage of feed therefrom during storage and transportation.

A still further objective is to provide a dispensing means which is operative to retain the feed within the bag thereby preventing spillage therefrom while at the same time allowing wild game to retrieve feed on demand.

Another objective of the present invention is to provide a wild game feeder apparatus which may utilize feed dispensing holes of different sizes in order to accommodate different feed types such as bird seed for birds or shelled corn for squirrels.

Another objective of the present invention is to provide a wild game feeder apparatus wherein the wild game perches may be positioned differently depending on the wild game type being fed.

It is a final object to provide a feeder apparatus which may be used for the feeding of many types of wild game such a squirrels and the like.

SUMMARY OF THE INVENTION

A disposable wild game feeder for containing and making available feed for the feeding of wild game including birds, squirrels or the like. The feeder has a generally cylindrical, semi-rigid bag having top and bottom ends. The bag is self-standing when placed on the bottom end. It has a means for dispensing feed from the bag and a means for releasably closing the dispensing means so as to retain the feed in the bag during storage. It also has removable means on the bag for supporting wild game adjacent the feeder during feeding therefrom.

BRIEF DESCRIPTION OF THE DRAWINGS

FIG. 5 is a front view of the feeder apparatus of the present invention.

DESCRIPTION OF THE PREFERRED EMBODIMENT

Figure 1:
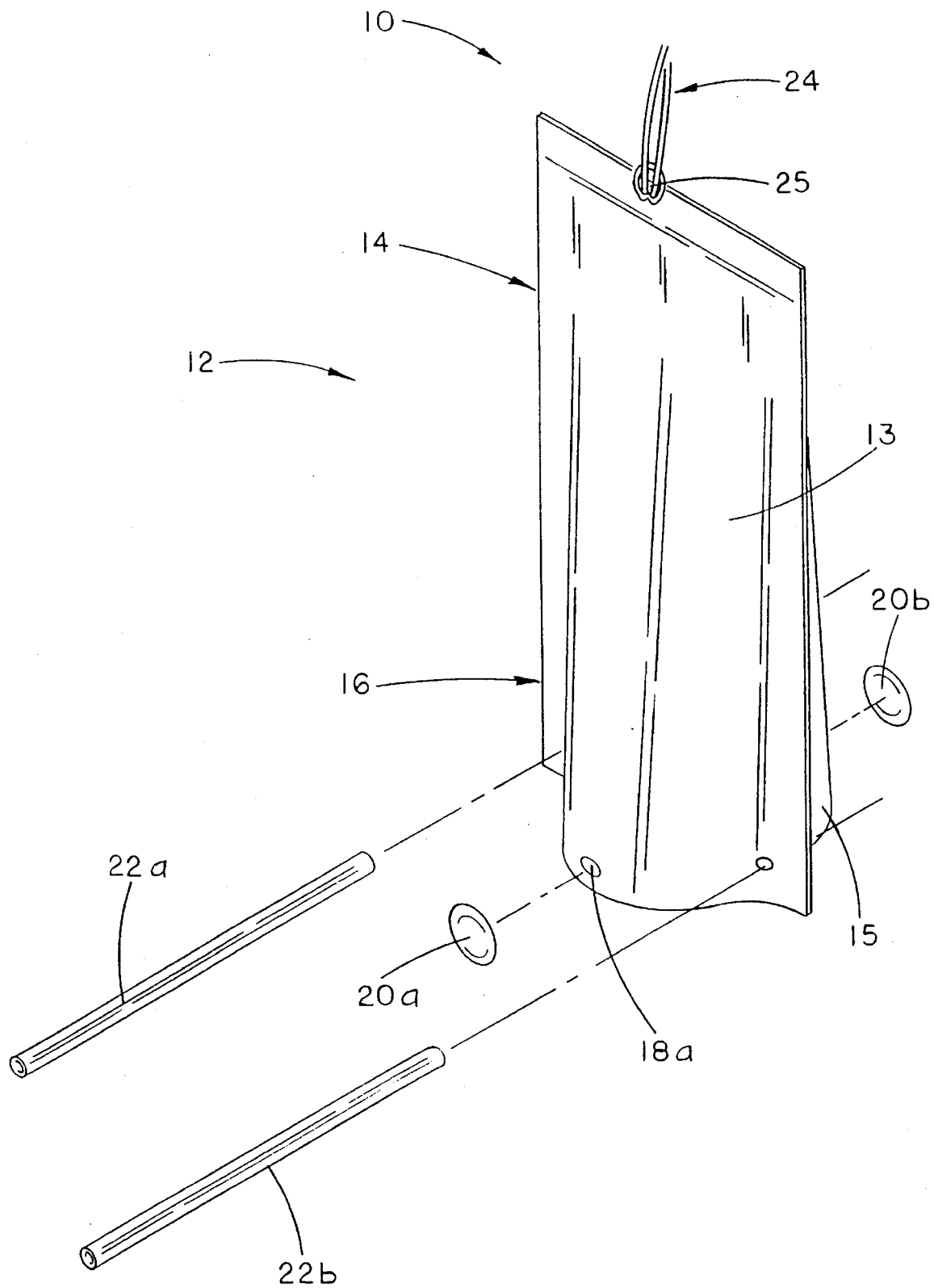
FIG. 1 is an exploded perspective view showing the interconnection of major components of the present invention.
Figure 4:
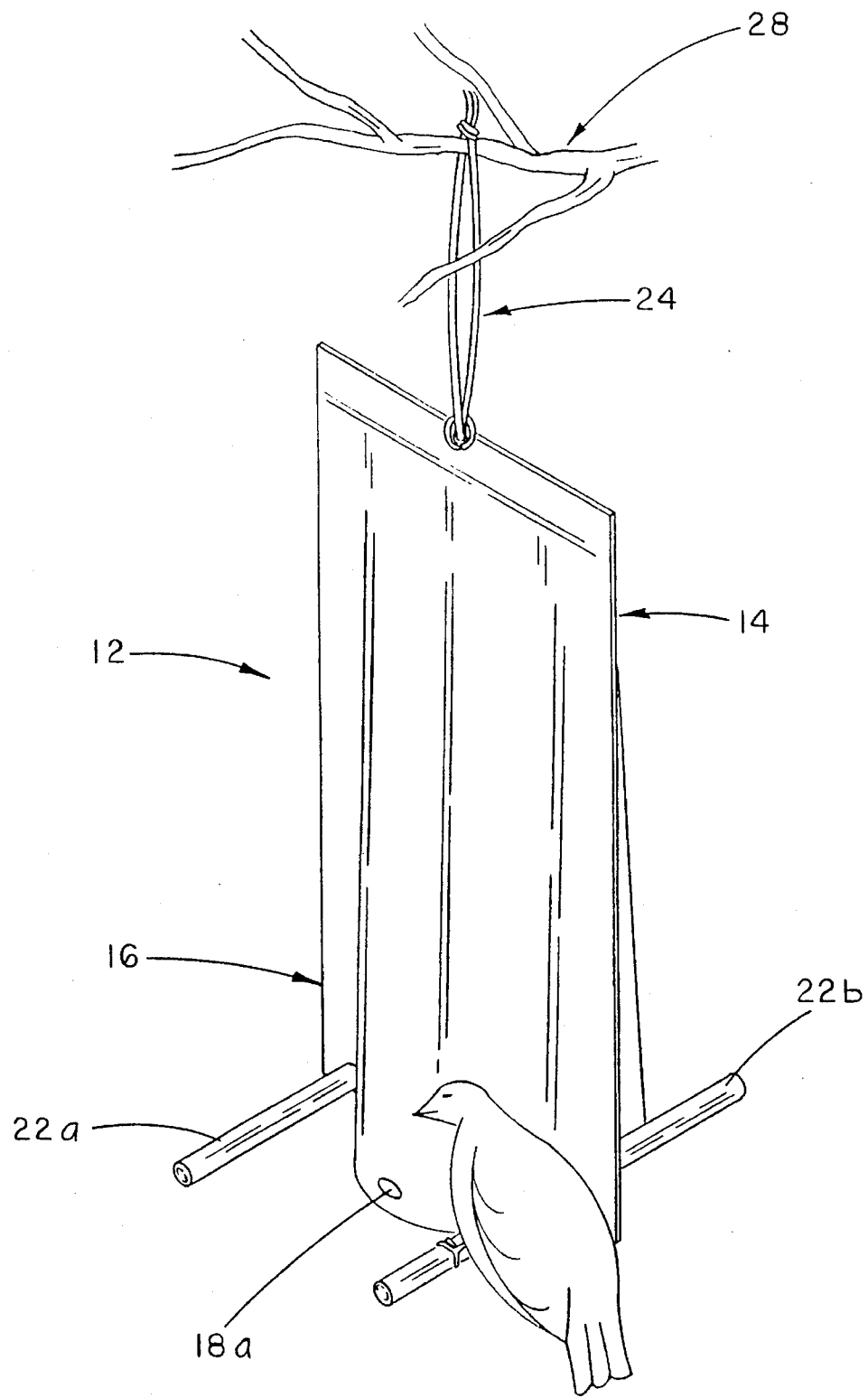
FIG. 4 is a side perspective view showing the feeder apparatus of the present invention in a second feeding configuration, hung from a tree.

The feeder apparatus 10 in one of its working environments is illustrated in FIGS. 1 and 4. As seen in these figures, the major components of the apparatus be are the bag 12, the dispensing means 18a, the support dowels 22a and 22b, and the support means 24 which may be a string, wire, or other similar support. As seen in these figures, the bottom portion 16 of bag 12 is adapted to receive a plurality of support dowels 22a and 22b therethrough. When the apparatus is configured for storage or transportation, the dowels 22a and 22b may be removed from bag 12 bottom portion 16 and taped to the side wall of bag 12. Additionally, it is seen that releasable closure means 20a and b may be secured to bag bottom portion 16 at the position of the dispensing means 18a and b respectively. In the preferred embodiment, this releasable closure means 20a and b would be simple tabs with adhesive on one side thereof which may be releasably adhered to the bag bottom portion 16 over dispensing holes 18a and b respectively. Closure means 20a and b prevent any inadvertent spillage of the feed contained within bag 12 while the bag is undergoing storage, transportation, or display for resale.

The top end 11 of bag 12 is preferably open during assembly of the feeder to provide for the insertion of seed or the like into the bag. After the bag is filled, the open top end 11 is closed and sealed by any appropriate means such as the heat weld seal 19 shown in the drawings or a zip-lock closure which would enable the bag to be refilled.

FIG. 4 illustrates use of the feeder apparatus in one of its two preferred feeding environments, namely hung from a tree branch. As seen in this figure, the support means 24 may be looped over tree branch 28 in the conventional way. Support means 24 is shown as a string tied through aligned holes 25 adjacent the top end of bag 12. Dowels 22a and b provide a means for a bird or other wild game to feed therefrom. Construction of the apparatus 10 also allows for game such a squirrels to feed therefrom.

Once the feeder apparatus 10 has been placed in its feeding position, the releasable closure means 20a and 20b may be easily removed simply by peeling off the tab. In the preferred embodiment, the dispensing means 18a and 18b would each be a small holes or slits cut vertically in the bag bottom portion 16 on opposite sides thereof. The dimensions of the hole or slit would be sufficiently small such that its size in conjunction with the semi-rigidity of the bag 12 would prevent any inadvertent seepage of feed therefrom. Conversely, the hole or slit would be sufficiently large to permit the projection of a bird's beak or animal's nose therethrough so as to permit its grasping of bird seed, shelled corn, or other feed contained therein.

As seen in the figures, the bag 12 comprises a top portion 14 through which the feed may be deposited. Once the bag 12 has been filled, this open top portion may be sealed by any desirable means such as zip locking, stapled, pressure sealed or otherwise secured in the closed position.

Figure 2:
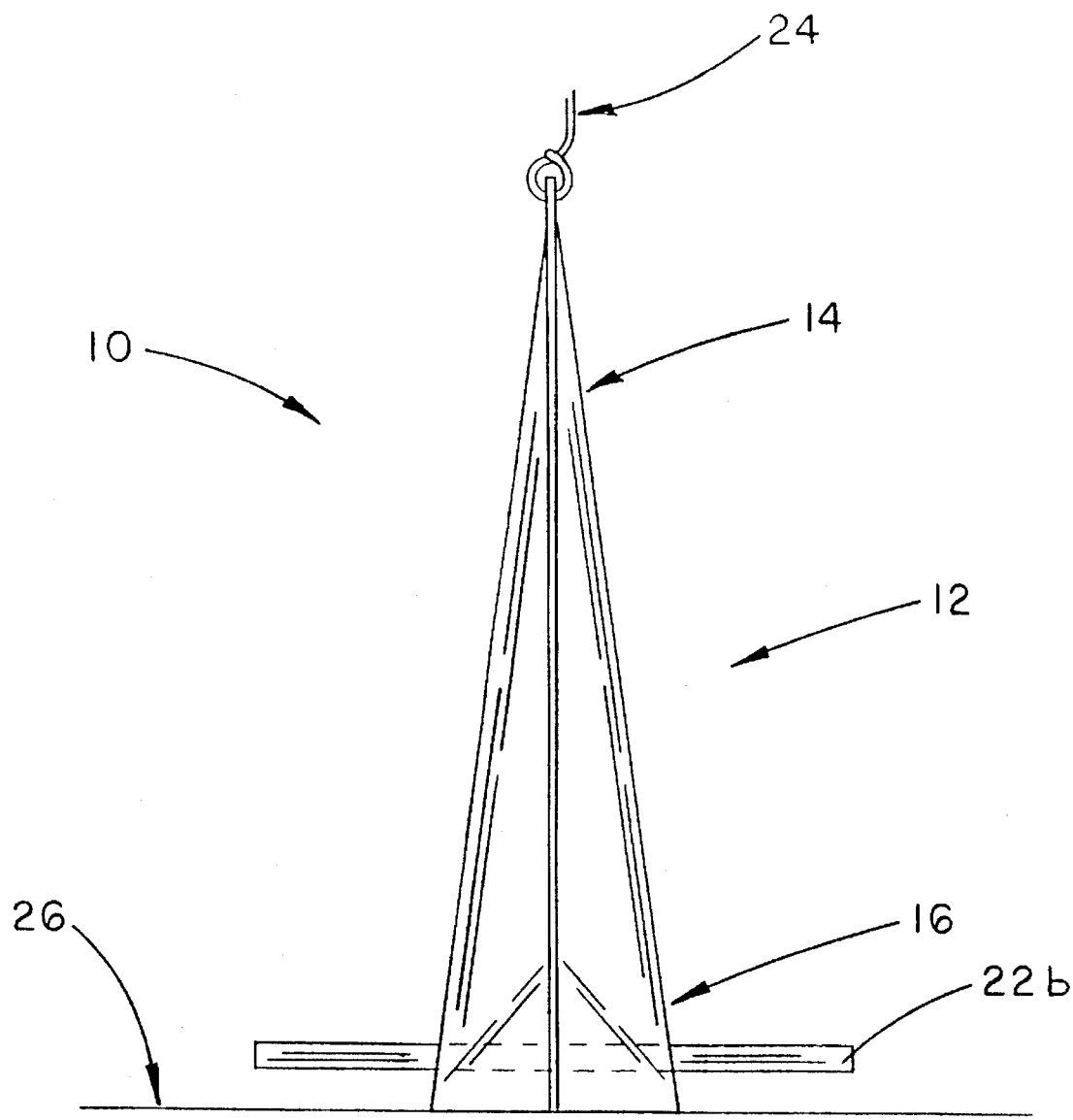
FIG. 2 is a side view of the feeder apparatus shown in a first feeding configuration, placed on a horizontal surface.
Figure 3:
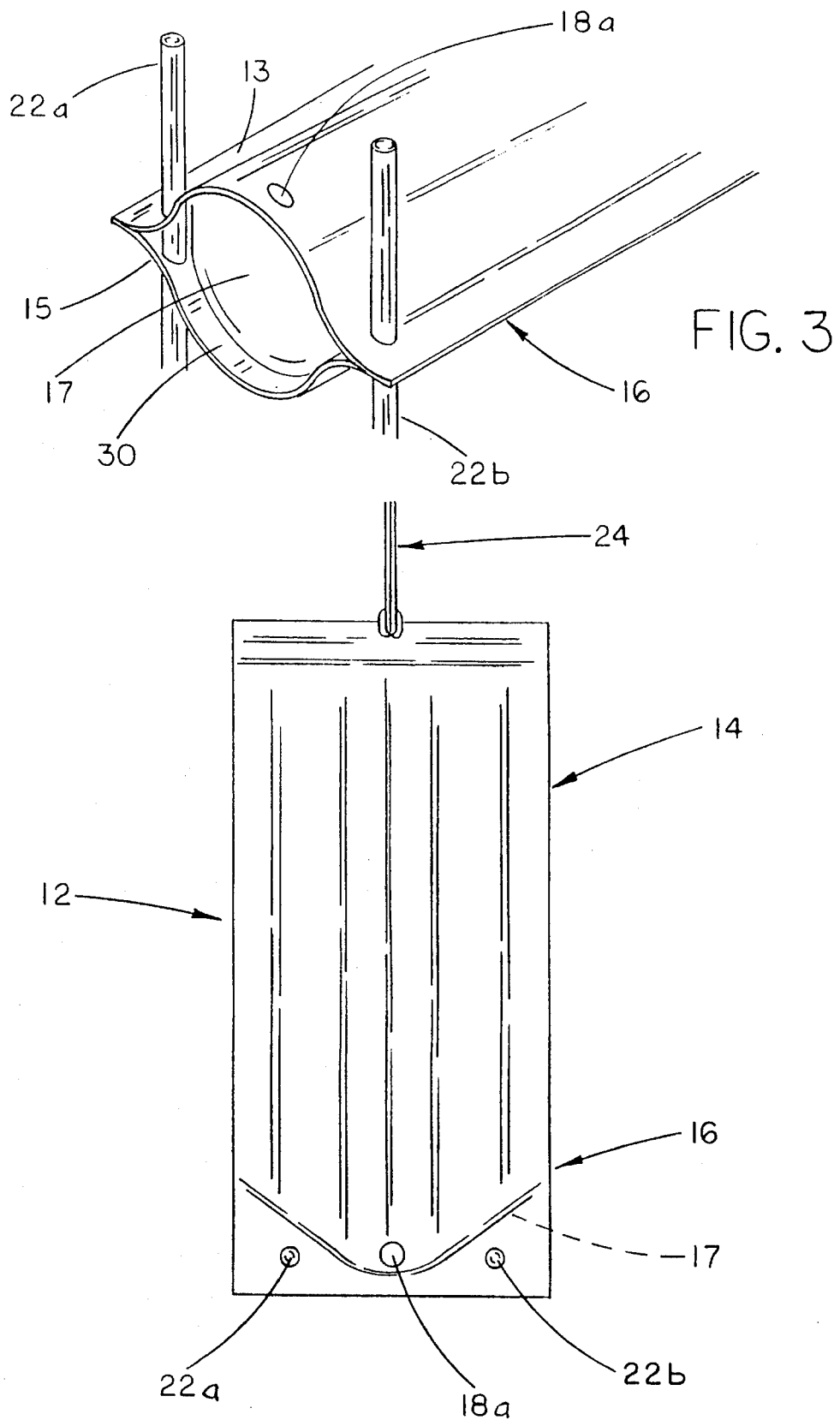
FIG. 3 is a bottom perspective view showing the feeder apparatus of the present invention.

An important feature of the present invention is clearly illustrated in the bottom perspective view of FIG. 3. As seen in this figure, the bottom portion 16 of bag 12 comprises a lip 30, the lower edge 32 of which is substantially planar upon filling of the bag 12 with seed. Lip 30 is constructed of the same semi-rigid material used to construct the remainder of bag 12. Lip 30 is preferably an integral extension of the bag front wall 13 and rear wall 15 which support a separate flexible bottom wall 17 extended between them. Therefore, lip 30 provides a mechanism for supporting the remainder of bag 12 on a horizontal surface or the like. This feeding environment is illustrated in FIG. 2. Therefore, due to the nature of lip 30 and the semi-rigidity of bag 12, the apparatus 10 is self-supporting.

As mentioned above, this self-supporting feature of the feeder apparatus 10 provides one of its major advantages over the prior art in that a horizontal support member such as a tree branch or the like is not required to use the feeder apparatus. Rather, if such a support is unavailable, the apparatus may simply be placed on any horizontal surface. Use of the support dowels 22a and 22b may be utilized in either operating environment, namely hung from a tree or placed on a horizontal surface in a self-standing orientation.

It is obvious that numerous other modifications and variations of the present invention are possible in view of the above teachings. For example, an important modification previously mentioned is that the size of the bag itself and the feed-dispensing holes may be altered to accommodate different feed types such as bird seed, shelled corn or whatever is favored by the particular species being fed. Another modification would be that the positioning of the bird perching dowels may be altered to accommodate birds of different sizes. Additionally, the size of the dowels themselves may be altered to accommodate different sized birds.

Therefore, it is to be understood that the above description is intended in no way to limit the scope of protection of the claims and is representative of only one of several possible embodiments of the present invention.

Thus, there has been shown and described an invention which accomplished at least all of the stated objectives.

We claim:

1. A disposable bird feeder for containing and making available bird seed for the feeding of birds comprising:

an upright flexible, semi-rigid bag, having top and bottom ends, front and rear walls including top, bottom and intermediate side portions and a bottom wall joined to said front and rear walls at said bottom portions thereof and closing the bottom end of said bag, said bottom portions of said front and rear walls extending downwardly from said bottom wall and defining a bag support lip, means for closing said top end upon insertion of said bird seed into said bag, said bag being self-standing on said bag support lip when placed on said bottom end;

dispensing means for dispensing seed from said bag;

means for releasably closing said dispensing means so as to retain said bird seed in said bag during storage;

a pair of holes positioned in the bottom portion of at least one of said front and rear walls adjacent said dispensing means; and a support member positioned in at least one of said holes.

2. The invention of claim 1 wherein said dispensing means is at least one slit in said bag operative to resist the outflow of seed by gravity but operative to permit the retrieval of seed when a bird projects its beak therethrough.

3. The invention of claim 2 wherein said slit is positioned in the bottom portion of said bag.

4. The invention of claim 1 wherein said means for releasably closing said dispensing means is an adhesive which may be placed over said dispensing means and secured to said bag.

5. The invention of claim 1 further comprising a means for supporting said feeder from a tree branch.

6. The invention of claim 1 wherein said support member is a wooden dowel.

7. A disposable wild game feeder for containing and making available feed for the feeding of wild game comprising:

an upright flexible, semi-rigid bag, having a top end and a closed bottom end, means for closing said top end upon insertion of said bird seed into said bag, said bag being self-standing when placed on said bottom end;

means for dispensing feed from said bag;

means for releasably closing said dispensing means so as to retain said feed in said bag during storage; and removable means on said bag for supporting wild game adjacent said feeder during feeding therefrom.

* * * * *